United States Patent
Mandalia et al.

(10) Patent No.: US 8,150,697 B2
(45) Date of Patent: Apr. 3, 2012

(54) AUTONOMOUS SYSTEMS AND NETWORK MANAGEMENT USING SPEECH

(75) Inventors: Baiju D. Mandalia, Boca Raton, FL (US); Pradeep P. Mansey, Coral Springs, FL (US)

(73) Assignee: Nuance Communications, Inc., Burlington, MA (US)

( * ) Notice: Subject to any disclaimer, the term of this patent is extended or adjusted under 35 U.S.C. 154(b) by 1306 days.

(21) Appl. No.: 10/677,891

(22) Filed: Sep. 30, 2003

(65) Prior Publication Data

US 2005/0071164 A1   Mar. 31, 2005

(51) Int. Cl.
*G10L 21/00* (2006.01)
*G10L 15/22* (2006.01)

(52) U.S. Cl. ............. 704/275; 704/270.1; 704/270

(58) Field of Classification Search ............. 704/270.1
See application file for complete search history.

(56) References Cited

U.S. PATENT DOCUMENTS

| | | | |
|---|---|---|---|
| 5,493,606 A | | 2/1996 | Osder et al. |
| 5,745,692 A * | | 4/1998 | Lohmann et al. ............. 709/223 |
| 6,119,087 A | | 9/2000 | Kuhn et al. |
| 6,195,641 B1 * | | 2/2001 | Loring et al. ................. 704/275 |
| 6,327,347 B1 * | | 12/2001 | Gutzmann ................. 379/88.02 |
| 6,418,440 B1 * | | 7/2002 | Kuo et al. ...................... 707/10 |
| 6,487,600 B1 | | 11/2002 | Lynch |
| 6,662,163 B1 * | | 12/2003 | Albayrak et al. ............. 704/275 |
| 7,003,463 B1 * | | 2/2006 | Maes et al. ................. 704/270.1 |
| 7,020,611 B2 * | | 3/2006 | Gilde et al. ................. 704/270.1 |
| 7,149,694 B1 * | | 12/2006 | Harb et al. ................. 704/270.1 |
| 2002/0094067 A1 | | 7/2002 | August |
| 2003/0225825 A1 * | | 12/2003 | Healey et al. ................. 709/203 |
| 2005/0038658 A1 * | | 2/2005 | Sladden ..................... 704/270.1 |
| 2005/0055216 A1 * | | 3/2005 | Bushey et al. ................ 704/277 |

FOREIGN PATENT DOCUMENTS

| | | |
|---|---|---|
| WO | WO 99/18566 | 4/1999 |
| WO | WO 02/32090 | 4/2002 |

OTHER PUBLICATIONS

Yankelovich, N., "Talking vs. Taking: Speech Access to Remote Computers", Conf. on Human Factors and Computing Systems, pp. 275-276, Apr. 24-28, 1994.

Srinivasan, S., et al., "Object Oriented Reuse: Experience in Developing a Framework for Speech Recognition Applications", Int'l. Conf. on Software Eng., pp. 322-330, 1998.

"Method and System for Managing Network Devices Via the Web", IBM Research Disclosure, pp. 1367-1369, Oct. 1998.

(Continued)

*Primary Examiner* — Talivaldis Ivars Smits
*Assistant Examiner* — Jesse Pullias
(74) *Attorney, Agent, or Firm* — Wolf, Greenfield & Sacks, P.C.

(57) ABSTRACT

A method of managing systems in a managed network can include storing configuration information corresponding to at least one managed system and automatically generating a grammar and a speech dialog for each managed system using the configuration information. User speech selecting a managed system can be received over a telephone call. The user speech can be recognized to identify the selected managed system. A grammar and speech dialog for the selected managed system can be loaded. Accordingly, the user can interact with one or more managed systems using the speech dialog. The user speech can be processed using the grammar.

6 Claims, 3 Drawing Sheets

OTHER PUBLICATIONS

Whittaker, S., et al., "Practical Issues in the Application of Speech Technology to Network & Customer Service Applications", Proc. of IVTTA '98, pp. 185-190, Sep. 29-30, 1998.

Eberman, B., et al., "Building voiceXML Browsers with OpenVXI", Proc. of 11th Int'l. Conf. on World Wide Web, pp. 713-717, May 7-11, 2002.

* cited by examiner

AUTONOMOUS SYSTEMS AND NETWORK MANAGEMENT USING SPEECH

BACKGROUND

1. Field of the Invention

The invention relates to the field of system administration and management and, more particularly, to performing such functions using a voice interface.

2. Description of the Related Art

Managing a network of computers and/or other devices can be a challenging task. Many different software programs are available, however, which help system administrators manage networks. Using network management software, an administrator can define the various components, resources, systems, and/or subsystems (hereafter systems) belonging to the network to be managed. Network management software also permits a system administrator to define tasks that may be performed on the managed system.

Presently, system administration follows the traditional model of command-line or console-based control. That is, an administrator interacts with a managed system via a conventional computer terminal, having a keyboard and display, which is communicatively linked to the managed system. The administration terminal frequently is located "on-premises" with the managed system. The system administrator can receive notifications and monitor the system by viewing messages on the administration terminal display. The system administrator also can provide instructions, queries, or other commands to the system by entering the appropriate information into a command line interface of the administration terminal display using the administrative terminal keyboard.

Through the administration terminal, the system administrator can interact with the system to perform administrative, managerial, and maintenance functions. Legacy software components, for example components written in the C family of programming languages, typically are managed through Simple Network Management Protocol (SNMP) via the administration terminal.

Other systems have come to use a resource management system for handling communications between the administration terminal and the system. For example, within a Java environment, the resource management system can be a Java Management Extension (JMX) enabled system for managing Java components. JMX is defined in the document entitled Java Management Extensions Instrumentation and Agent Specification, v1.1 (March 2002), published by Sun Microsystems, Inc. of Palo Alto, Calif. The JMX specification, which is incorporated herein by reference, defines an architecture, design patterns, application programming interfaces (APIs), and services for application and network management using the Java programming language. The JMX specification is a set of specifications and development tools for managing Java environments and building management solutions.

While conventional management systems allow for significant control over managed resources, such management systems do have disadvantages. One disadvantage is that the operation of conventional network management software typically involves the installation of client software on an administrative computer system or terminal. The administrative terminal must be communicatively linked with the network being managed. In consequence, the administrative terminal typically is located in the same vicinity or proximate to the managed network. In other words, the administration terminal often is located "on-premises" with the managed network or system. This essentially requires that the administrator also be located on-premises with the managed system so that any necessary actions can be implemented via the administrative console.

Still other management systems allow for control over managed resources using a thin client such as a Web browser. Through the thin client, the administrator can communicate with the resources being managed. While this solution may not require software to be installed on the client system, such configurations do require data connectivity to the managed systems and/or resources.

SUMMARY OF THE INVENTION

The present invention provides a method, system, and apparatus for providing speech control of administrative or management functions (hereafter administrative functions) relating to manageable systems within a managed network. According to the present invention, configuration data relating to one or more managed systems can be stored. Using the stored configuration data, an autonomic agent can automatically generate any grammars and speech dialogs that may be necessary for interacting with each managed system. The speech dialogs can be loaded into a telephony interface or manager on an as needed basis as administrators call to initiate administrative functions on the systems being managed.

One aspect of the present invention can include a method of administering systems in a managed network. The method can include storing configuration information corresponding to at least one managed system and automatically generating a grammar and a speech dialog for each managed system using the configuration information. User speech selecting a managed system can be received over a telephone call. The user speech can be recognized to identify the selected managed system. A grammar and speech dialog for the selected managed system can be loaded so that the user can interact with the managed system using the grammar and speech dialog.

In one embodiment of the present invention, user speech specifying an administrative function to be performed on the selected managed system can be received. The speech can be converted to a textual representation using the grammar. The textual representation can be matched with an administrative command corresponding to the selected managed system. In another embodiment, the matching step can first select a set of administrative commands corresponding to the selected managed system from which the textual representation can be matched. If necessary, the administrative command can be formatted according to a system management protocol specified by the configuration information for the selected managed system. The administrative command then can be forwarded to the selected managed system.

Another aspect of the present invention can include a method of administering systems in a managed network including storing a system speech profile for each managed system within the managed network, connecting a managed system to the managed network, detecting the managed system, and loading the system speech profile for the detected managed system. At least one grammar and at least one system prompt can be automatically created that corresponds with the detected managed system. The grammar and system prompts can be used in processing speech inputs from a user accessing the detected managed system via a telephony interface.

Another aspect of the present invention can include a network management system. The system can include a configuration data store having stored therein a system speech profile for each system to be managed and an autonomic agent capable of communicating with each system to be managed. The autonomic agent can automatically generate a grammar and a speech dialog for each managed system using the system speech profiles. The system further can include a telephony manager that answers a telephone call, identifies a managed system from user speech received over the call, and obtains from the autonomic agent a grammar and speech dialog corresponding to the identified managed system. Notably, the telephony manager can interact with the user using the grammar and speech dialog such that the user can instruct the autonomic agent to initiate administrative functions on the identified managed system.

Other embodiments of the present invention, when configured in accordance with the inventive arrangements disclosed herein, can include a system for performing, and a machine readable storage for causing a machine to perform, the various processes disclosed herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
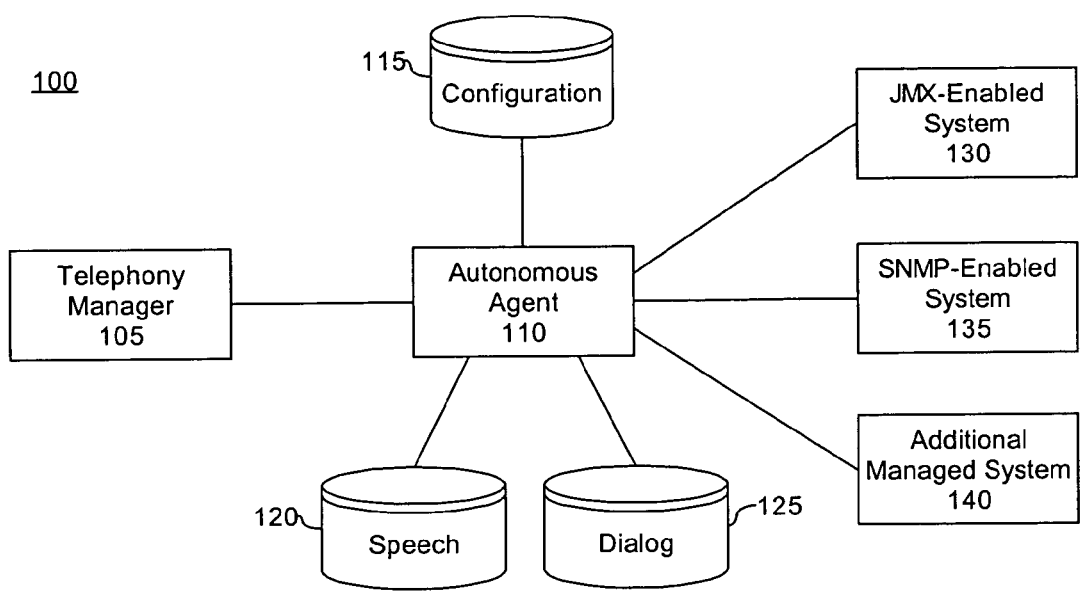
FIG. 1 is a schematic diagram illustrating a system for administering one or more systems in accordance with one embodiment of the inventive arrangements disclosed herein.

FIG. 1 is a schematic diagram illustrating a system 100 for administering a network in accordance with one embodiment of the inventive arrangements disclosed herein. As shown, the system 100 can include an autonomic agent 105, a telephony manager 110, as well as several data stores 115, 120, and 125. The system 100 provides a system administrator with the ability to administer one or more of systems 130, 135, and 140 using speech commands through a telephony interface.

The autonomic agent 110 can be communicatively linked with the telephony manager 105, the data stores 115-125, and the managed systems 130-140 through a suitable communications network. For example, the aforementioned components can be communicatively linked via a Wide Area Network (WAN), a Local Area Network (LAN), an intranet, the Internet, or another suitable communications network.

The managed systems 130-140 can be any of a variety of independent systems ranging from telephony switching systems to information processing systems, or any other system that can be managed using some form of management control software. For example, as shown, system 130 can be a Java Management Extension (JMX) enabled system. System 135 can be a Simple Network Management Protocol (SNMP) compliant system. One or more other systems which can be compliant with other appropriate management software can be included as illustrated by system 140.

As each system 130-140 is installed, configuration information pertaining to that system can be created and stored within the configuration data store 115. More particularly, each managed system 130-140 can be associated with a system speech profile generated by a system administrator. Each system speech profile can specify which functions of a given managed system have been installed and are available on the managed network, as well as which functions are to be voice-enabled and made available to system administrators via a telephony interface. The configuration information also can specify the particular control system and protocol used by each managed system 130-140 as well as any translation rules for converting received spoken utterances to valid administration commands for each respective managed system 130-140.

The telephony manager 105 is a computer system configured to provide telephone access to applications and data. The telephony manager 105 can include appropriate software and hardware interfaces for receiving Internet Protocol (IP) calls, conventional landline telephone calls, wireless calls, cellular calls, or any combination thereof. Additionally, the telephony manager 105 can include interfaces for communicating with any of a variety of different telephony platforms and/or other applications as mentioned herein, including the Public Switched Telephone Network (PSTN).

The telephony manager 105 can include a speech recognition engine that detects and recognizes words spoken over a received call and passes those words to an application as text. The speech recognition engine further can process dual tone multi-frequency signals as may be received from a touch-tone telephone. An audio playback system also can be included for playing prompts to callers. For example, the telephony manager 105 can include an audio playback system to play recorded audio, or a text-to-speech (TTS) engine, or both. The TTS engine can synthesize speech from application text for playback over an established telephone call.

The autonomic agent 110 is configured to interact with the one or more managed systems 130-140 using appropriate management protocols. For example, the autonomic agent 105 can receive text from the telephony manager 105 and format that text as an SNMP message, a JMX message, or another message type depending upon which system the received text or instruction is to be routed and the management system protocol used by the target managed system. Rather than each system 130-140 using a separate management system, each can be administered via the autonomic agent 110. Accordingly, despite the particular management protocol used by each individual system, the autonomic agent 110 can receive speech recognized text and format the text according to the management protocol corresponding to the managed system to which the speech command was directed. The autonomic agent 110 can utilize the configuration data and, more particularly, the system speech profile of the target managed system, to perform such formatting operations. The formatted command can be provided to the managed system.

Similarly, upon receiving information from each managed system 130-140, the autonomic agent 110 can parse and extract the relevant information, as the syntax for received messages is known. The extracted information can be provided to the TTS engine to be played to a user over an established telephony link.

The autonomic agent 110 can automatically construct grammars and speech dialogs corresponding to each managed system 130-140. Using the configuration information stored in the configuration data store 115, the autonomic agent 110 builds grammars for each system 130-140. Each grammar is stored in the speech data store 120 and is associated with the particular managed system with which the grammar is to be used. Each speech dialog generated for one of the managed systems 130-140 is stored within the dialog data store 125. The speech dialogs include one or more prompts that can be played, for example through the TTS engine, to a system administrator over a telephone call. It should be appreciated that while grammars and speech dialogs for each selected system can be automatically generated from the configuration information, a system administrator also can manually edit this information.

In operation, the telephony manager 105 can receive and answer a telephone call. The user initiating the telephone call can be identified and authenticated by the telephony manager 105, for example through an initial dialog in which the user is prompted for an identifier such as a user name as well as a corresponding password. The user then can specify a particular managed system to which the user wishes to gain access, whether through speech or a DTMF selection. After determining which managed system the user wishes to access, the telephone manager 105 retrieves the speech dialog corresponding to the selected system from the autonomic agent 110. Once the appropriate speech dialog has been retrieved and loaded into the telephony manager 105, the user can begin accessing administrative functions of the selected managed system using speech commands through the telephone.

Figure 2:
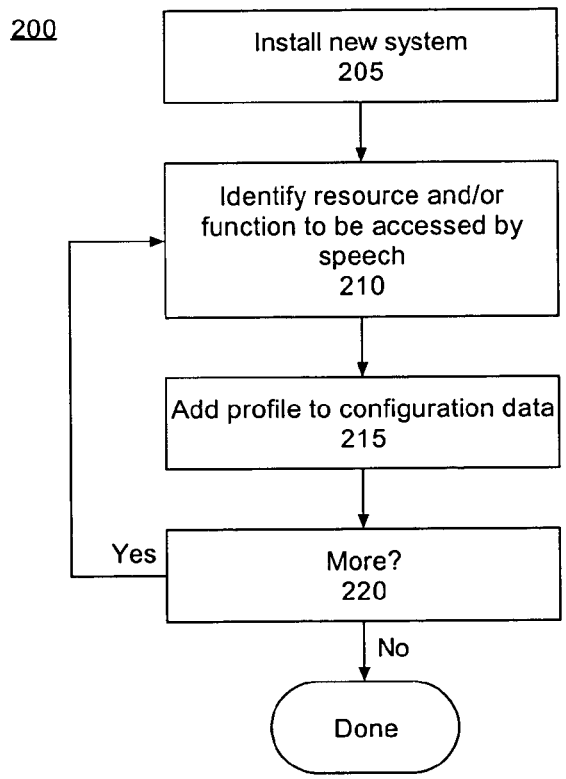
FIG. 2 is a flow chart illustrating a method of adding a system to a managed network to be administered through a telephony interface in accordance with one embodiment of the inventive arrangements disclosed herein.

FIG. 2 is a flow chart illustrating a method 200 of adding a system to a network to be administered through a telephony interface in accordance with one embodiment of the inventive arrangements disclosed herein. The method can begin in step 205, where a new system is installed in the managed network. In step 210, a resource of the new system that is to be voice-enabled can be identified. A resource can include, but is not limited to, any function, including an administrative function, pertaining to an installed system that is accessible to an administrator or other user. In step 215, a description of the resource identified in step 210 can be added to the configuration data and, in particular, to the system speech profile of the newly added system. In step 220, a determination can be made as to whether any further resources or functions of the newly installed system remain to be added to the configuration data. If so, the method can loop back to step 210 to repeat as necessary. If not, the method can end.

Figure 3:
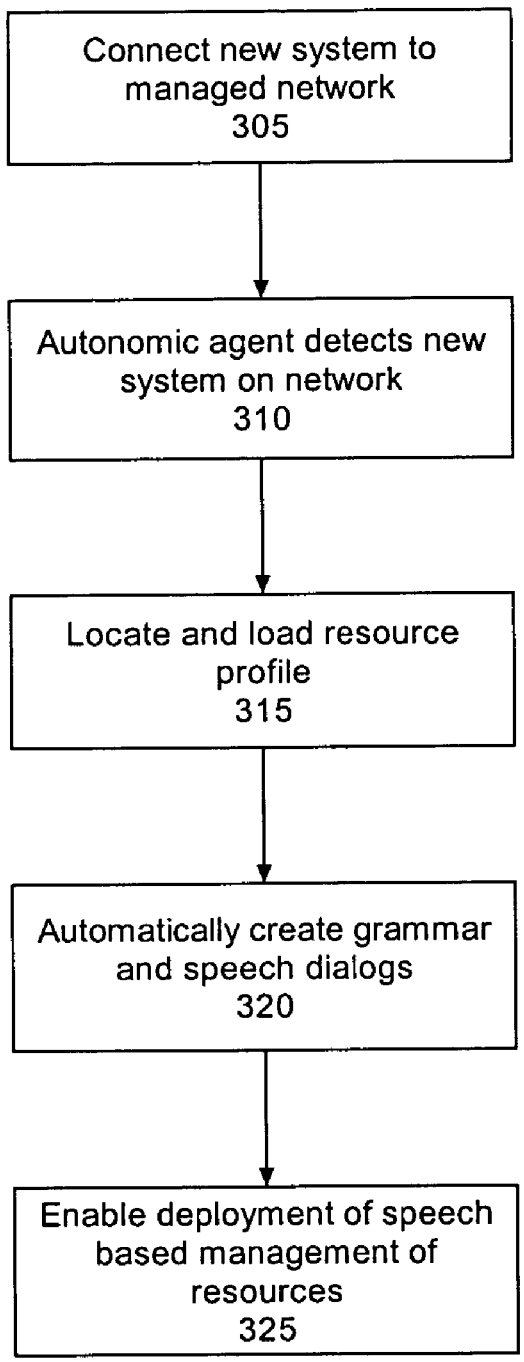
FIG. 3 is a flow chart illustrating a method of registering systems to be managed within a managed network in accordance with one embodiment of the inventive arrangements disclosed herein.

FIG. 3 is a flow chart illustrating a method 300 of registering systems for management in accordance with one embodiment of the inventive arrangements disclosed herein. In step 305, the newly installed system can be connected to a managed network. In step 310, the autonomic agent within the network can detect the system. In step 315, from the configuration data store, the autonomic agent can locate and load the system speech profile corresponding to the newly attached managed system. The autonomic agent then can generate grammars and speech dialog for the new system from the configuration data in step 320. In step 325, the deployment of speech-based management systems can be enabled.

Figure 4:
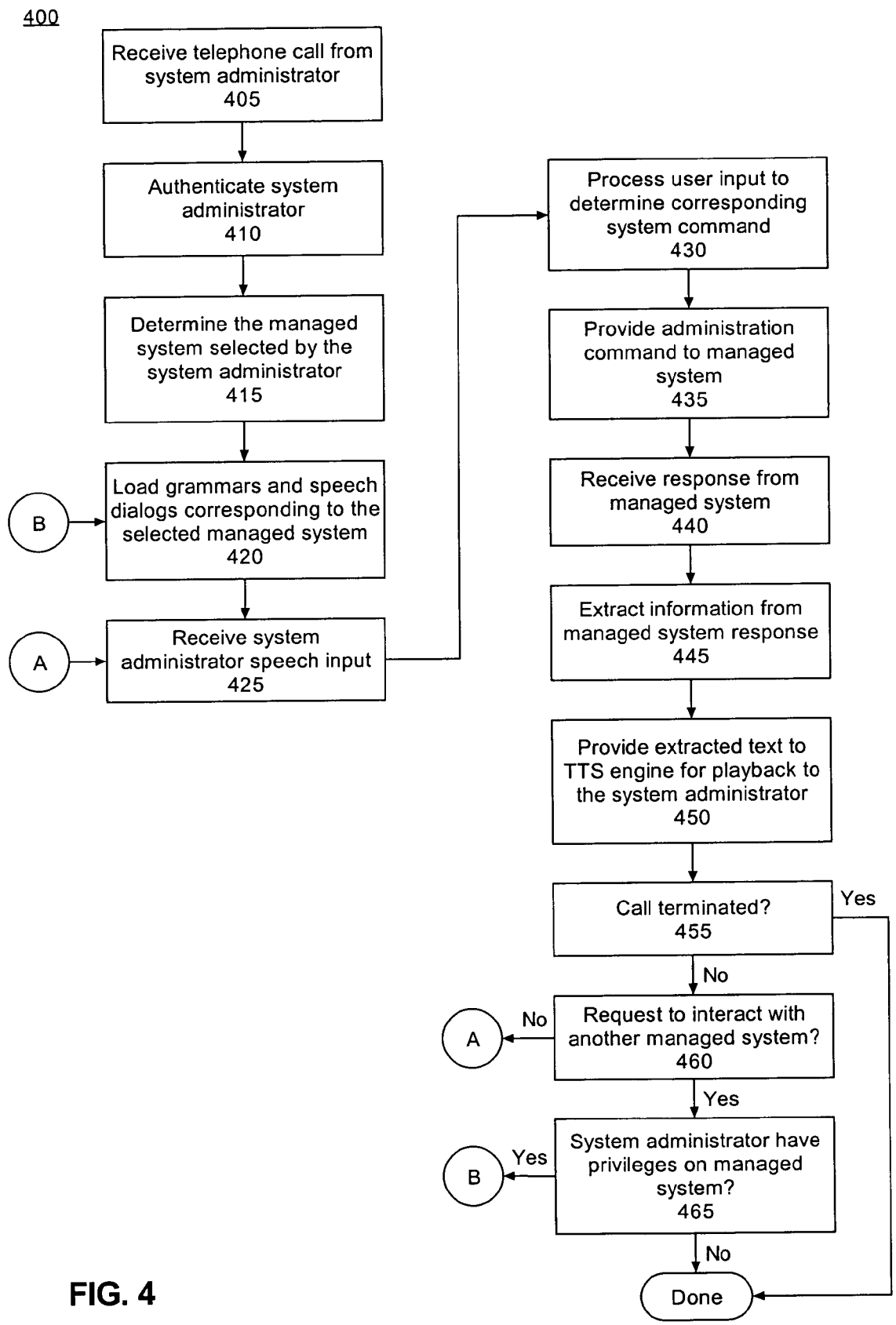
FIG. 4 is a flow chart illustrating a method of administering one or more systems in accordance with one embodiment of the inventive arrangements disclosed herein.

FIG. 4 is a flow chart illustrating a method 400 of administering a network in accordance with one embodiment of the inventive arrangements disclosed herein. The method can begin in a state where several systems have been installed in a managed network and been enabled for voice access. Accordingly, in step 405, a system administrator can initiate a telephone call to the telephony manager. The telephone call be initiated via a conventional landline telephone, a wireless telephone, a cellular telephone, an IP-enabled telephone including a computer system, or any other device that can initiate a telephone call that can be routed or transferred into the PSTN or provided to the telephony manager by other means.

In step 410, the telephony manager can authenticate the system administrator by requesting identifying information in the form of either DTMF signals and/or user speech. For example, the telephony manager can request a username and/or password. Other methods of authentication, however, can be used as well. For example, biometric authentication mechanisms such as speaker verification or voice print matching technology can be used to match an administrator voice print received over the telephone call with a stored voice print. The telephony unit used by the administrator to initiate the telephone call further can be equipped with a biometric sensor such as a fingerprint detection mechanism that can transmit data to the telephony manager for authentication purposes. In any case, one skilled in the art will recognize that any of a variety of authentication mechanisms can be used. Accordingly, the present invention is not limited by the particular type of authentication methodology or technology used or the various examples disclosed herein.

In step 415, through continued interaction with the system administrator, the telephony manager can determine which of the managed systems the system administrator wishes to access. It should be appreciated, however, that in cases where only a single system is managed, step 415 need not be performed. Rather, the system can default to the only system under management.

In step 420, after identifying the particular system selected by the system administrator, the grammars and speech dialogs associated with the selected system can be loaded into the telephony manager, thereby allowing the system administrator to issue voice commands for administering the managed system. More particularly, the grammars and speech dialogs can be retrieved from the speech and dialog data stores via the autonomic agent. Accordingly, speech input from the system administrator can be received by the telephony manager in step 425 over the established telephone call. The speech input can specify a system administration command for the selected system under management.

In step 430, the received speech input can be processed to determine a corresponding system command. More particularly, the speech input can be speech recognized and converted to text by the telephony manager using the loaded grammar. In one embodiment, the telephony manager further can match the text with an administrative command as specified by the grammar. In another embodiment, the autonomic agent can match the resulting text representation of the speech input with a system command using the configuration data store. Alternatively, the autonomic agent can format any textual representations and/or system commands to generate system administration messages. For example, the autonomic agent can format either the system commands or speech recognized text according to the management protocol corresponding to the managed system being accessed, as specified by the configuration data store. In any case, the autonomic agent can provide the determined administrative command and/or message to the managed system in step 435. Upon execution of the system command, the managed system can provide a response back to the autonomic agent in step 440.

In step 445, the autonomic agent can extract information from the response from the managed system as dictated by the configuration data store. In step 450, the extracted information can be provided to the telephony manager so that the TTS engine can render an audio representation of the text to the system administrator over the established telephone call. It should be appreciated, however, that in another embodiment of the present invention, the autonomic agent need not extract information from the response. In that case, the entire response can be provided to the telephony manager for playback to the system administrator. Accordingly, whether the managed system provides information that the system administrator has requested, or merely provides an indication that a command has been successfully or unsuccessfully executed, the response can be provided to the system administrator via the TTS engine.

In step 455, the telephony manager can monitor whether the call has been terminated. If so, the method end. If not, however, the method can proceed to step 460, where a determination can be made as to whether the user has requested access to another managed system. If so, the method can proceed to step 465. If not, the method can proceed to step 425 to receive further speech inputs and process those inputs as necessary.

Continuing with step 465, in the case where the system administrator has requested access to a different managed system, the telephony manager can determine whether the system administrator has access privileges on the different managed system. According to one embodiment of the present invention, the telephony manager can access a data store, such as the configuration data store, specifying the access privileges of the system administrator to make the determination. In another embodiment, the telephony manager can authenticate the system administrator for the different managed system. In any case, if the system administrator has privileges on the new managed system or is successfully authenticated, the method can proceed to step 420 to load the appropriate grammars and speech dialogs to process speech commands for the new managed system. If the system administrator does not have privileges on the new managed system or the authentication process fails, the method can end, at which point the call can be terminated.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of administering a plurality of managed systems in a managed network using a voice interface, the method comprising:

storing a configuration data store comprising a system speech profile corresponding to at least one managed system of the plurality of managed systems, wherein the system speech profile specifies which capabilities of the at least one managed system are available on the managed network and which capabilities are to be voice-enabled and made accessible via a telephony interface; and automatically generating a grammar and a speech dialog for the at least one managed system using the system speech profile, wherein:

the speech dialog for the at least one managed system includes at least one generated audio prompt that is played via a telephone in response to accessing, via the telephony interface, at least one of the capabilities of the at least one managed system that are specified in the system speech profile to be voice-enabled, and wherein the at least one of the voice enabled capabilities comprises at least one administrative function to administer the at least one managed system, the grammar is used to process speech input received from a user in response to the at least one generated audio prompt, the speech dialog allows the user to administer the at least one managed system by accessing the at least one administrative function via at least one voice command, and the at least one generated audio prompt comprises information extracted from a response from the at least one managed system responsive to the at least one voice command as dictated by the configuration data store.

2. The method of claim 1, further comprising:

adding a new managed system to the managed network by:
connecting the new managed system to the managed network;
detecting the new managed system; and
loading a system speech profile for the detected managed system.

3. The method of claim 1, wherein each system speech profile is generated based on specific capabilities of its corresponding managed system.

4. The method of claim 1, further comprising an act of:
providing an interface that enables a system administrator to manually edit the automatically generated speech dialog.

5. At least one computer readable storage device encoded with computer-executable instructions that, when executed on a computer system, perform a method of administering a plurality of managed systems in a managed network using a voice interface, the method comprising:

storing a configuration data store comprising a system speech profile corresponding to each managed system, wherein each system speech profile specifies which capabilities of its corresponding managed system that are available on the managed network and which capabilities are to be voice-enabled and made accessible via a telephony interface; and automatically generating a grammar and a speech dialog for each managed system using its corresponding system speech profile, wherein:

the speech dialog for each managed system includes at least one generated audio prompt that is played via a telephone in response to accessing, via the telephony interface, at least one of the capabilities of its corresponding managed system that are specified in the corresponding system speech profile to be voice-enabled, wherein the at least one of the voice enabled capabilities comprises at least one administrative function to administer the corresponding managed system, the grammar is used to process speech input received from a user in response to the at least one generated audio prompt, the speech dialog allows the user to administer the corresponding managed system by accessing the at least one administrative function via at least one voice command, and the at least one generated audio prompt comprises information extracted from a response from the corresponding managed system responsive to the at least one voice command as dictated by the configuration data store.

6. A computer system for administering a plurality of managed systems in a managed network, the computer system comprising:

a telephony interface to the managed network;

at least one controller, coupled to the telephony interface, that:

stores a configuration data store comprising a system speech profile corresponding to each managed system, wherein each system speech profile specifies which capabilities of its corresponding managed system are available on the managed network and which capabilities are to be voice-enabled and made accessible via a telephony interface; and automatically generates a grammar and a speech dialog for each managed system using its corresponding system speech profile, wherein:

the speech dialog for each managed system includes at least one generated audio prompt that is played via a telephone in response to accessing, via the telephony interface, at least one of the capabilities of its corresponding managed system that are specified in the corresponding system speech profile to be voice-enabled, wherein the at least one of the voice enabled capabilities comprises at least one administrative function to administer the corresponding managed system, the grammar is used to process speech input received from a user in response to the at least one generated audio prompt, the speech dialog allows the user to administer the corresponding managed system by accessing the at least one administrative function via at least one voice command, and the at least one generated audio prompt comprises information extracted from a response from the corresponding managed system responsive to the at least one voice command as dictated by the configuration data store.

* * * * *